(12) United States Patent
Lee et al.

(10) Patent No.: US 8,119,038 B2
(45) Date of Patent: Feb. 21, 2012

(54) ORGANIC ELECTROLYTE SOLUTION COMPRISING GLYCIDYL ETHER COMPOUND AND LITHIUM BATTERY EMPLOYING THE SAME

(75) Inventors: Seok-soo Lee, Yongin-si (KR); Young-gyoon Ryu, Yongin-si (KR); Dong-joon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 428 days.

(21) Appl. No.: 12/015,785

(22) Filed: Jan. 17, 2008

(65) Prior Publication Data

US 2009/0035656 A1 Feb. 5, 2009

(30) Foreign Application Priority Data

Jul. 31, 2007 (KR) .................. 10-2007-0077178

(51) Int. Cl.
*H01B 1/12* (2006.01)
*H01M 4/13* (2010.01)

(52) U.S. Cl. ........... 252/519.33; 252/519.34; 252/519.3; 429/231.95

(58) Field of Classification Search ............ 252/519.33, 252/519.34, 519.3; 429/231.95
See application file for complete search history.

(56) References Cited

U.S. PATENT DOCUMENTS

| | | | | |
|---|---|---|---|---|
| 3,494,897 | A * | 2/1970 | Starcher et al. | 526/281 |
| 3,715,342 | A * | 2/1973 | Colomb et al. | 526/281 |
| 3,784,492 | A * | 1/1974 | Colomb et al. | 536/32 |
| 3,836,509 | A * | 9/1974 | Colomb et al. | 525/59 |
| 6,533,964 | B1 * | 3/2003 | Hata et al. | 252/511 |
| 6,537,468 | B1 * | 3/2003 | Hata et al. | 252/511 |
| 6,576,159 | B1 * | 6/2003 | Michot et al. | 252/511 |
| 2003/0180611 | A1 * | 9/2003 | Mikhaylik et al. | 429/218.1 |
| 2004/0039153 | A1 * | 2/2004 | Elce et al. | 528/403 |
| 2006/0188806 | A1 * | 8/2006 | Lee et al. | 430/270.1 |
| 2009/0043059 | A1 * | 2/2009 | Liaw et al. | 526/171 |

OTHER PUBLICATIONS

CAS reg. No. 2495-47-8, Nov. 16, 1984.*
Megahed et al. "Lithium-ion Rechargeable Batteries." Journal of Power Sources, 51, 1994, pp. 79-104.

* cited by examiner

*Primary Examiner* — Douglas McGinty
(74) *Attorney, Agent, or Firm* — Christie, Parker & Hale, LLP

(57) ABSTRACT

An organic electrolytic solution includes a lithium salt; an organic solvent containing a high dielectric constant solvent and/or a low boiling point solvent; and a glycidyl ether compound represented by Formula 1:

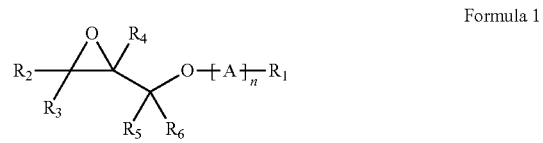

Formula 1 where, n, $R_1$, $R_2$, $R_3$, $R_4$, $R_5$, $R_6$ and A are described in the detailed description. In conventional organic electrolytic solutions, irreversible capacity is increased due to decomposition of a polar solvent. A lithium battery employing the organic electrolytic solution has excellent charge/discharge characteristics by inhibiting cracks of a negative electrode active material which occur during charging and discharging of the battery. Therefore, the lithium battery can have high stability, reliability and charge/discharge efficiency.

18 Claims, 1 Drawing Sheet

ORGANIC ELECTROLYTE SOLUTION COMPRISING GLYCIDYL ETHER COMPOUND AND LITHIUM BATTERY EMPLOYING THE SAME

CROSS-REFERENCE TO RELATED APPLICATIONS

This application claims the benefit of Korean Application No. 2007-77178, filed Jul. 31, 2007, in the Korean Intellectual Property Office, the disclosure of which is incorporated herein by reference.

BACKGROUND OF THE INVENTION

1. Field of the Invention

Aspects of the present invention relate to an organic electrolytic solution including a glycidyl ether compound and a lithium battery employing the same. More particularly, aspects of the present invention relate to an organic electrolytic solution including a glycidyl ether compound capable of effectively inhibiting side reactions and a lithium battery capable of improving a battery charge/discharge characteristics by employing the organic electrolytic solution.

2. Description of the Related Art

As portable electronic devices such as video cameras, cellular phones, notebook computers, etc., become more lightweight and have increasingly improved performance, research into batteries used as power supplies for such portable devices is being conducted. In particular, rechargeable lithium secondary batteries are being actively researched, since they have three times the energy density per unit weight compared to conventional lead storage batteries, nickel-cadmium batteries, nickel-hydrogen batteries, nickel-zinc batteries, etc., and can be rapidly charged. In general, since a lithium battery is generally driven at a high operating voltage, a conventional aqueous electrolyte solution cannot be used. This is because lithium contained in an anode and an aqueous solution vigorously react with each other. Thus, an organic electrolytic solution in which a lithium salt is dissolved in an organic solvent is generally used as the electrolyte in a lithium battery. Such organic solvents should generally have high ionic conductivity, a high dielectric constant and low viscosity. However, since it is difficult to obtain a single organic solvent satisfying all these requirements, a mixed solvent may be used that includes, for example, an organic solvent with a high dielectric constant and an organic solvent with a low viscosity.

When using a carbonate-based polar nonaqueous solvent, carbon contained in an anode and an electrolyte in the lithium secondary battery react with each other during the initial charging, and thus, an excess amount of electric charge is used. In such an irreversible reaction, a passivation layer, such as a solid electrolyte interface (SEI) film, is formed on the surface of the negative electrode. The SEI film enables the battery to be stably charged and discharged without further decomposition of the electrolyte solution (J. Power Sources, 51(1994), 79-104). The SEI film also acts as an ion tunnel through which only lithium ions pass. Generally, organic solvents solvate lithium ions. Thus, cointercalation of an organic solvent, which solvates the lithium ions and moves with the lithium ions into a carbon anode during charging and discharging of the battery, generally occurs. However, an SEI film as described above only allows lithium ions to pass and prevents cointercalation of an organic solvent, thereby preventing a breakdown of the anode structure which is caused by cointercalation of the organic solvent during charging and discharging of the battery. However, the SEI film gradually cracks due to swelling and shrinking of an active material caused by repeated charging and discharging and becomes separated from the surface of the electrode. Thereafter, since the electrolyte directly contacts the active material, the electrolyte becomes continuously decomposed. The cracks of the SEI film develop as a result of charging and discharging of the battery and deteriorate the active material. Particularly, if the active material includes a metal such as silicon, a large variation of the active material volume increases the deterioration of the active material. In addition, repeated swelling and shrinking of the active material volume induces agglomeration of silicon particles.

Accordingly, in order to solve the problems of the conventional art, improvement of charge/discharge characteristics of batteries is still desired by preventing direct contact between a metal active material and an electrolyte without decreasing the ionic conductivity of lithium ions.

SUMMARY OF THE INVENTION

Aspects of the present invention provide an organic electrolytic solution blocking direct contact between a metal active material and an electrolyte by employing a glycidyl ether compound without decreasing ionic conductivity of lithium ions.

Aspects of the present invention also provide a lithium battery having improved charge/discharge characteristics by employing the organic electrolytic solution.

According to an aspect of the present invention, there is provided an organic electrolytic solution comprising: a lithium salt; an organic solvent comprising a high dielectric constant solvent and/or a low boiling point solvent; and a glycidyl ether compound represented by Formula 1:

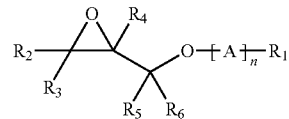

Formula 1 wherein,
A is selected from the group consisting of a C2-C5 alkyleneoxide group which is unsubstituted or substituted with a halogen atom; —C(=O)— and —C($R_7$)($R_8$)—,
$R_1$ is selected from the group consisting of a C1-C20 alkoxy group which is unsubstituted or substituted with a halogen atom; a C6-C30 aryloxy group which is unsubstituted or substituted with a halogen atom; a C1-C20 alkyl group which is unsubstituted or substituted with at least one of a halogen atom and an oxirane group; a C5-C20 aliphatic hydrocarbon ring which is unsubstituted or substituted with a halogen atom; a C5-C20 aliphatic heterocyclic ring which is unsubstituted or substituted with a halogen atom; a C6-C30 aryl group which is unsubstituted or substituted with a halogen atom; a C7-C20 alkylaryl group which is unsubstituted or substituted with a halogen atom; a C7-C20 arylalkyl group which is unsubstituted or substituted with a halogen atom; a C2-C30 heteroaryl group which is unsubstituted or substituted with a halogen atom; an ether-containing monovalent group which is unsubstituted or substituted with a halogen atom; and —Si($R_9$)($R_{10}$)($R_{11}$),
$R_2$, $R_3$, $R_4$, $R_5$ and $R_6$ are each independently selected from the group consisting of a hydrogen atom; a C1-C20 alkoxy group which is unsubstituted or substituted with a halogen atom; a C6-C30 aryloxy group which is unsubstituted or substituted with a halogen atom; a C1-C20 alkyl group which is unsubstituted or substituted with a halogen atom; and a C5-C20 aliphatic hydrocarbon ring which is unsubstituted or substituted with a halogen atom, $R_7$ and $R_8$ are each independently a hydrogen atom; or a C1-C20 alkyl group which is unsubstituted or substituted with a halogen atom, $R_9$, $R_{10}$ and $R_{11}$ are each independently selected from the group consisting of a hydrogen atom; a C1-C20 alkoxy group which is unsubstituted or substituted with a halogen atom; a C6-C30 aryloxy group which is unsubstituted or substituted with a halogen atom; and a C1-C20 alkyl group which is unsubstituted or substituted with a halogen atom, and n is an integer of 0-10.

According to another aspect of the present invention, there is provided a lithium battery comprising: a cathode; an anode; and the organic electrolytic solution.

In conventional organic electrolytic solutions, irreversible capacity is increased due to decomposition of a polar solvent. However, an organic electrolytic solution according to aspects of the present invention includes a glycidyl ether compound, and thus a lithium battery employing the organic electrolytic solution according to aspects of the present invention has excellent charge/discharge characteristics by inhibiting cracks of a negative electrode active material which occur during charging and discharging of the battery. Therefore, the lithium battery can have high stability, reliability and charge/discharge efficiency.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
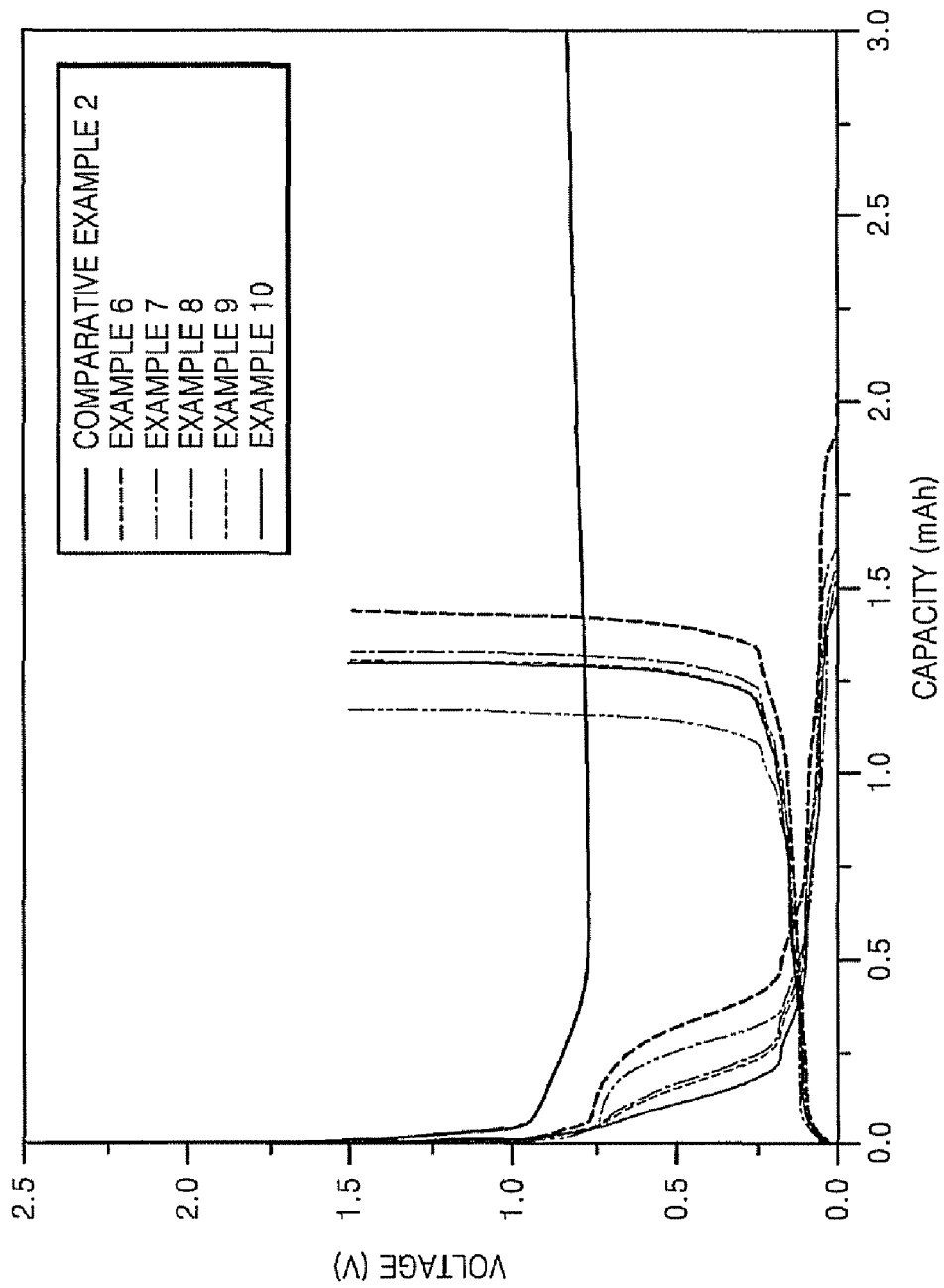
FIG. 1 is a graph illustrating initial charge/discharge curves of lithium batteries according to Examples 6 to 10 and Comparative Example 2.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide an organic electrolytic solution including: a lithium salt; an organic solvent comprising a high dielectric constant solvent and a low boiling point solvent; and a glycidyl ether compound represented by Formula 1.

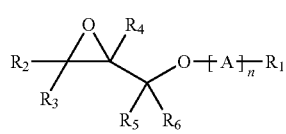

Formula 1 wherein,

A is selected from the group consisting of a C2-C5 alkyleneoxide group that is unsubstituted or substituted with a halogen atom; —C(=O)— and —C($R_7$)($R_8$)—, $R_1$ is selected from the group consisting of a C1-C20 alkoxy group which is unsubstituted or substituted with a halogen atom; a C6-C30 aryloxy group which is unsubstituted or substituted with a halogen atom; a C1-C20 alkyl group which is unsubstituted or substituted with at least one of a halogen atom and an oxirane group; a C5-C20 aliphatic hydrocarbon ring which is unsubstituted or substituted with a halogen atom; a C5-C20 aliphatic heterocyclic ring which is unsubstituted or substituted with a halogen atom; a C6-C30 aryl group which is unsubstituted or substituted with a halogen atom; a C7-C20 alkylaryl group which is unsubstituted or substituted with a halogen atom; a C7-C20 arylalkyl group which is unsubstituted or substituted with a halogen atom; a C2-C30 heteroaryl group which is unsubstituted or substituted with a halogen atom; an ether-containing monovalent group which is unsubstituted or substituted with a halogen atom; and —Si($R_9$)($R_{10}$)($R_{11}$), $R_2$, $R_3$, $R_4$, $R_5$ and $R_6$ are each independently selected from the group consisting of a hydrogen atom; a C1-C20 alkoxy group which is unsubstituted or substituted with a halogen atom; a C6-C30 aryloxy group which is unsubstituted or substituted with a halogen atom; a C1-C20 alkyl group which is unsubstituted or substituted with a halogen atom; and a C5-C20 aliphatic hydrocarbon ring which is unsubstituted or substituted with a halogen atom, $R_7$ and $R_8$ are each independently a hydrogen atom; or a C1-C20 alkyl group which is unsubstituted or substituted with a halogen atom, $R_9$, $R_{10}$ and $R_{11}$ are each independently selected from the group consisting of a hydrogen atom; a C1-C20 alkoxy group which is unsubstituted or substituted with a halogen atom; a C6-C30 aryloxy group which is unsubstituted or substituted with a halogen atom; and a C1-C20 alkyl group which is unsubstituted or substituted with a halogen atom, and n is an integer of 0-10.

Hereinafter, functions of the glycidyl ether compound having the structure described above in an organic electrolytic solution, such as an organic electrolytic solution of a lithium battery, will be described. The invention may, however, be embodied in many different forms and should not be construed as being limited to the embodiments set forth herein.

When the glycidyl ether compound receives electrons in the electrolyte, the ether bond included in the oxirane group of the glycidyl ether is transformed into an anionic radical. Since the anionic radical has unstable energy, the ether bond is broken into a negatively-charged oxygen atom and a positively-charged carbon atom.

In the broken ether bond, the negatively-charged oxygen atom is able to trap lithium ions or reacts with the electrolyte solution to form a large molecular weight compound. In addition, the positively-charged carbon atom can be bound to a hydride ion or an adjacent negatively-charged oxygen atom to form a dimer.

The glycidyl ether compound including the ether bond, which is broken into positive charges and negative charges as described above, continuously reacts with adjacent compounds to form a film on the surface of the electrode.

Such film can prevent the active material from contacting the electrolyte. In addition, the film can prevent cracks caused by variations in the volume of the negative electrode active material involved in lithium intercalation and deintercalation.

Meanwhile, the alkyl group, aryl group or polyhydrocarbon ring of the glycidyl ether compound have solvent phobicity, and thus can be easily adsorbed on the interface between the solvent and the electrode.

In addition, the polar ether bond on the surface of the film has an affinity to lithium ions. Thus, the electrolyte and lithium ions included in the electrolytic solution can be easily diffused within the film. As a result, since lithium ions can be diffused within the film (passivation layer) formed by the glycidyl ether compound, the charging and discharging of the lithium battery may not be affected.

The halogen atom may be fluorine, chlorine, bromine or iodine.

Examples of the unsubstituted C2-C5 alkyleneoxide group include ethylene oxide, propylene oxide and isobutylene oxide. At least one hydrogen atom of the unsubstituted C2-C5 alkyleneoxide can be substituted with a halogen atom.

The unsubstituted C1-C20 alkoxy group may be represented by formula —$OX_1$, wherein $X_1$ is an alkyl group such as is described below. Examples of the unsubstituted C1-C20 alkoxy group include methoxy, ethoxy, cyclohexyloxy, and isopropyloxy. At least one of the hydrogen atoms in the C1-C20 alkoxy group may be substituted with a halogen atom.

The unsubstituted C6-C30 aryloxy group may be represented by formula —$OX_1$, wherein $X_1$ is an aryl group such as is described below. Examples of the unsubstituted C6-C20 aryloxy group include phenyloxy, naphthyloxy, diphenyloxy. At least one of the hydrogen atoms in the C6-C20 aryloxy group may be substituted with a halogen atom.

Examples of the unsubstituted C1-C20 alkyl group include methyl, ethyl, propyl, isopropyl, n-butyl, sec-butyl, pentyl, iso-amyl, hexyl, heptyl, octyl, nonyl, decyl and dodecyl. At least one of the hydrogen atoms in the C1-C20 alkyl group may be substituted with an oxirane group or a halogen atom.

The C5-C20 aliphatic hydrocarbon ring may be a single ring or may be a structure comprising a plurality of rings and may include a double bond within the rings. Examples of the unsubstituted C5-C20 aliphatic hydrocarbon ring include a norbornene group, a cyclohexyl group and a cycloheptyl group, but are not limited thereto. At least one of the hydrogen atoms in the C5-C20 aliphatic hydrocarbon ring may be substituted with a halogen atom.

The term "C5-C20 aliphatic heterocyclic ring" refers to a hydrocarbon ring in which at least one carbon atom is substituted with at least one atom selected from the group consisting of oxygen, nitrogen and sulfur. The C5-C20 aliphatic heterocyclic ring may be a single ring or may be a structure comprising a plurality of rings. Examples of the unsubstituted C5-C20 aliphatic heterocyclic ring include an oxetane group and an oxirane group, but are not limited thereto. At least one of the hydrogen atoms in the C5-C20 aliphatic heterocyclic ring may be substituted with a halogen atom.

The term "C6-C30 aryl group" refers a carbocyclic aromatic system having 6 to 30 carbon atoms and including at least one aromatic ring. Where more than one ring is present, the rings may be fused or connected to each other by a single bond. At least one of the hydrogen atoms in the C6-C30 aryl group may be substituted with a halogen atom as described in the C1-C20 alkyl group.

Examples of the substituted or unsubstituted C6-C30 aryl group include a phenyl group, a $C_1$-$C_{10}$ alkylphenyl group (e.g., an ethylphenyl group), a halophenyl group (e.g., an o-, m- or p-fluorophenyl group or a dichlorophenyl group), a cyanophenyl group, a dicyanophenyl group, a trifluoromethoxyphenyl group, a biphenyl group, a halobiphenyl group, a cyanobiphenyl group, a $C_1$-$C_{10}$ alkylbiphenyl group, a $C_1$-$C_{10}$ alkoxybiphenyl group, an o-, m-, or p-tolyl group, an o-, m- or p-cumenyl group, a mesityl group, a phenoxyphenyl group, a (α,α-dimethylbenzene)phenyl group, a (N,N'-dimethyl)aminophenyl group, a (N,N'-diphenyl)aminophenyl group, a pentalenyl group, an indenyl group, a naphthyl group, a halonaphthyl group (e.g., a fluoronaphthyl group), a $C_1$-$C_{10}$ alkylnaphthyl group (e.g., a methylnaphthyl group), a $C_1$-$C_{10}$ alkoxynaphthyl group (e.g., a methoxynaphthyl group), a cyanonaphthyl group, an anthracenyl group, an azulenyl group, a heptalenyl group, an acenaphthalenyl group, a phenalenyl group, a fluorenyl group, an anthraquinolyl group, a methylanthryl group, a phenanthryl group, a triphenylene group, a pyrenyl group, a chrysenyl group, an ethyl-chrysenyl group, a picenyl group, a perylenyl group, a chloroperylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyranthrenyl group and an ovalenyl group.

The term "C7-C20 alkylaryl group" refers to an alkyl group in which at least one hydrogen atom is substituted with an aryl group. The unsubstituted C7-C20 alkylaryl group may be a benzyl group, but is not limited thereto, and at least one of the hydrogen atoms in the C7-C20 alkyaryl group may be substituted with a halogen atom.

The term "C7-C20 arylalkyl group" refers to an aryl group in which at least one hydrogen atom is substituted with an alkyl group. The unsubstituted C7-C20 arylalkyl group may be a 4-tert-butylphenyl group and a 4-ethylphenyl group, but is not limited thereto. At least one of the hydrogen atoms in the C7-C20 arylalkyl group may be substituted with a halogen atom.

The term "C2-C30 heteroaryl group" refers to a system comprising at least one aromatic ring which includes at least one hetero atom selected from the group consisting of N, O, P and S. and carbon rings. Where more than one aromatic ring is present, the aromatic rings may be fused or connected to each other by a single bond. At least one of the hydrogen atoms in the C2-C30 heteroaryl group may be substituted with a halogen atom.

Examples of the unsubstituted C2-C30 heteroaryl group include a pyrazolyl group, an imidazolyl group, an oxazolonyl group, a thiazolyl group, a triazolyl group, a tetrazolyl group, an oxadiazolyl group, a pyridinyl group, a pyridazinyl group, a pyrimidinyl group, a triazinyl group, a carbazolyl group, an indolyl group, a quinolinyl group and an isoquinolinyl group.

The term "ether-containing monovalent group" refers to a group in which at least one carbon atom in one of an alkyl group, alkenyl group, alkynyl group and alkoxy group is substituted with a C—O— bond. At least one hydrogen atom in the unsubstituted ether-containing monovalent group may be substituted with a halogen atom.

As a non-limiting example, the glycidyl ether compound of Formula 1 may be represented by Formula 2.

Formula 2

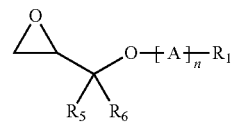

wherein $R_1$, $R_5$, $R_6$, A and n are the same described with reference to Formula 1.

As a more specific, non-limiting example, the glycidyl ether compound of Formula 1 may represented by Formula 3.

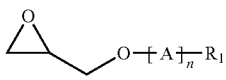

Formula 3 wherein $R_1$, A and n are the same described with reference to Formula 1.

Meanwhile, in the glycidyl ether compound represented by one of the Formulae 1 through 3, at least one hydrogen atom of $R_1$, $R_2$, $R_3$, $R_4$, $R_5$, $R_6$, $R_7$, $R_8$, $R_9$, $R_{10}$ and $R_{11}$ may be substituted with a halogen atom, such as, for example, a fluorine atom.

When a hydrogen atom of the glycidyl ether compound is substituted with a halogen atom, the surface activity of the glycidyl ether compound can be improved. The surface activity can further be improved when a compound having surface activity is substituted with a halogen atom such as fluorine.

In the above Formulae 1 through 3, when $R_1$ is —Si($R_9$)($R_{10}$)($R_{11}$) and $R_9$, $R_{10}$ and/or $R_{11}$ is an alkoxy group, the alkoxy group may be a linear or branched alkoxy radical having 1 to 20 carbon atoms, such as, for example, a linear or branched radical having 1 to 12 carbon atoms. For example, the alkoxy radical may be a lower alkoxy having 1 to 6 carbon atoms. Such an alkoxy radical may be one of methoxy, ethoxy, n-propoxy, isopropoxy, n-butoxy, isobutoxy, sec-butoxy, t-butoxy, pentoxy and hexoxy. A lower alkoxy radical having 1 to 3 carbon atoms can also be used.

As even more specific, non-limiting examples, the glycidyl ether compound of Formula 1 may be represented by at least one compound selected from the group consisting of Formulae 4 to 11.

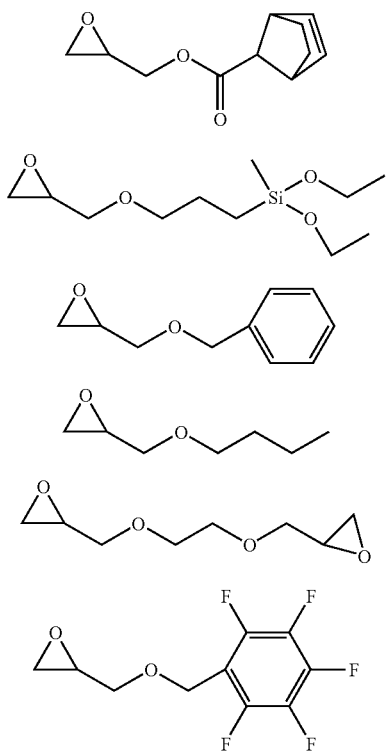

Formula 4

Formula 5

Formula 6

Formula 7

Formula 8

Formula 9

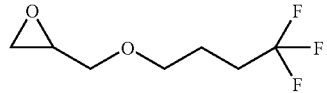

Formula 10

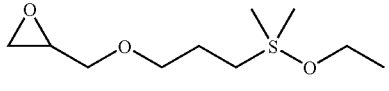

Formula 11

In the organic electrolytic solution, the amount of the glycidyl ether compound represented by Formulae 1 to 11 may be from 0.1 to 10% by weight, or, as a more specific, non-limiting example, from 1 to 5% by weight, based on the total weight of the organic solvent. When the amount of the glycidyl ether compound is greater than 10% by weight, charge/discharge characteristics may be decreased due to a relatively smaller amount of the effective material that determines the performance of the battery. On the other hand, when the amount of the glycidyl ether compound is less than 0.1% by weight, the effect of the glycidyl ether compound is not sufficient.

The high dielectric constant solvent is not particularly restricted and may be a high dielectric constant solvent commonly used in the art. For example, the high dielectric constant solvent may be a cyclic carbonate such as ethylene carbonate, propylene carbonate and butylene carbonate, or γ-butyrolactone.

Also, the low boiling point solvent is not particularly restricted and may be a low boiling point solvent commonly used in the art. For example, the low boiling point solvent may be an aliphatic carbonate such as dimethyl carbonate, ethylmethyl carbonate, diethyl carbonate and dipropyl carbonate, dimethoxyethane, diethoxyethane, or a fatty acid ester derivative.

The volumetric ratio of the high dielectric constant solvent to the low boiling point solvent may be 1:1 to 1:9. When the ratio is outside of this range, the discharge capacity and charge/discharge cycle life of the battery may be degraded. However, either the high dielectric constant solvent or low boiling point solvent can be used alone.

The lithium salt may be any lithium salt that is commonly used in a lithium battery. For example, the lithium salt may include at least one compound selected from $LiClO_4$, $LiCF_3SO_3$, $LiPF_6$, $LiN(CF_3SO_2)$, $LiBF_4$, $LiC(CF_3SO_2)_3$ and $LiN(C_2F_5SO_2)_2$. The concentration of lithium salt in the organic electrolytic solution may be 0.5 to 2.0 M. When the concentration of the lithium salt is less than 0.5 M, the conductivity of the electrolytic solution is low, thereby degrading the performance of the electrolytic solution. When the concentration of the lithium salt is greater than 2.0 M, the viscosity of the electrolytic solution is high, and thus the mobility of lithium ions is low.

The organic electrolytic solution according to aspects of the present invention may include $LiClO_4$ as the lithium salt, propylene carbonate as the high dielectric constant solvent and a compound represented by one of Formulae 4 to 11 as the glycidyl ether compound.

A lithium battery employing the organic electrolytic solution and a method of manufacturing the same will now be described.

A lithium battery according to aspects of the present invention includes a cathode, an anode, and the organic electrolytic solution including a glycidyl ether compound. The lithium battery is not particularly restricted and may be a lithium primary battery or a lithium secondary battery, such as a lithium ion battery, a lithium ion polymer battery, or a lithium sulfur battery.

The lithium battery according to aspects of the present invention can be manufactured as follows.

A cathode active material, a conducting agent, a binder and a solvent are mixed to prepare a cathode active material composition. The cathode active material composition is directly coated on an Al current collector and dried to prepare a cathode plate. Alternatively, the cathode active material composition is cast on a separate substrate and a film obtained therefrom is laminated on an Al current collector to prepare a cathode plate.

The cathode active material may be any lithium containing metal oxide that is commonly used in the art. Examples of the lithium containing metal oxide include $LiCoO_2$, $LiMn_xO_{2x}$, $LiNi_{x-1}Mn_xO_{2x}$ (x=1, 2) and $Ni_{1-x-y}Co_xMn_yO_2$ (0≦x≦0.5, 0≦y≦0.5).

Carbon black may be used as the conducting agent. The binder may be vinylidene fluoride/hexafluoropropylene copolymer, polyvinylidene fluoride (PVdF), polyacrylonitrile, polymethylmethacrylate, polytetrafluoroethylene and a mixture thereof, or a styrene butadiene rubber-based polymer. The solvent may be N-methylpyrrolidone (NMP), acetone, water, etc. Amounts of the cathode active material, the conducting agent, the binder and the solvent may be those commonly used in a lithium battery.

Similarly, an anode active material, a conducting agent, a binder and a solvent are mixed to prepare an anode active material composition. The anode active material composition is directly coated on a Cu current collector, or is cast on a separate substrate and an anode active material film obtained therefrom is laminated on a Cu current collector to obtain an anode plate. Amounts of the anode active material, the conducting agent, the binder and the solvent may be those commonly used in a lithium battery.

Silicon metal, a silicon thin film, lithium metal, a lithium alloy, carbonaceous material or graphite may be used as the anode active material. The conducting agent, the binder and the solvent in the anode active material composition may be the same as those in the cathode active material composition. If desired, a plasticizer may be added to the cathode active material composition and the anode active material composition to produce pores in the electrode plates.

The separator may be composed of any material that is commonly used in a lithium battery. A material having a low resistance to the movement of ions of the electrolyte and a good ability to absorb the electrolytic solution may be used. For example, the material may be a non-woven or woven fabric selected from the group consisting of glass fiber, polyester, Teflon, polyethylene, polypropylene, polytetrafluoroethylene (PTFE) and a combination thereof. More specifically, a lithium ion battery may use a windable separator comprising one of polyethylene, polypropylene, etc., and a lithium ion polymer battery may use a separator having an excellent ability to impregnate an organic electrolytic solution.

The separator may be prepared using the following method. A polymer resin, a filler and a solvent are mixed to prepare a separator composition. The separator composition is directly coated on an electrode and dried to form a separator film. Alternatively, the separator composition may be cast on a substrate and dried, and then a separator film formed on the substrate is peeled off and laminated on an electrode.

The polymer resin is not particularly restricted and may be any material that is used in a conventional binder for an electrode plate. Examples of the polymer resin include vinylidenefluoride/hexafluoropropylene copolymer, polyvinylidenefluoride, polyacrylonitrile, polymethylmethacrylate and a mixture thereof. In particular, vinylidenefluoride/hexafluoropropylene copolymer containing 8 to 25% by weight of hexafluoropropylene can be used.

The separator is interposed between the cathode plate and the anode plate to form a battery assembly. The battery assembly is wound or folded and placed in a cylindrical or rectangular battery case. Then, the organic electrolytic solution according to aspects of the present invention is injected into the battery case to complete the lithium ion battery.

Alternatively, a battery assembly may be prepared in the form of a bicell and the organic electrolytic solution according to an embodiment of the present invention may be impregnated therein. Then, the resultant is placed in a pouch and sealed to complete the lithium ion polymer battery.

Aspects of the present invention will now be described in greater detail with reference to the following examples. The following examples are for illustrative purposes only and are not intended to limit the scope of the invention.

Example 1

Preparation of Electrolytic Solution

5% by weight of a glycidyl silane compound represented by Formula 4 was added as an additive to an organic solvent containing propylene carbonate, and 1 M $LiClO_4$ was used as a lithium salt to prepare an organic electrolytic solution.

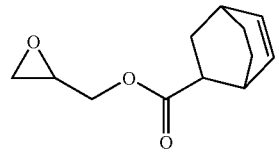

Formula 4

Example 2

Preparation of Electrolytic Solution

An organic electrolyte solution was prepared in the same manner as in Example 1, except that a compound represented by Formula 5 instead of the compound represented by Formula 4 was used.

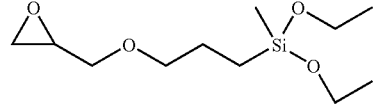

Formula 5

Example 3

Preparation of Electrolytic Solution

An organic electrolyte solution was prepared in the same manner as in Example 1, except that a compound represented by Formula 6 instead of the compound represented by Formula 4 was used.

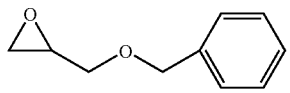

Formula 6

Example 4

Preparation of Electrolytic Solution

An organic electrolyte solution was prepared in the same manner as in Example 1, except that a compound represented by Formula 7 instead of the compound represented by Formula 4 was used.

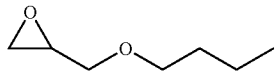

Formula 7

Example 5

Preparation of Electrolytic Solution

An organic electrolyte solution was prepared in the same manner as in Example 1, except that a compound represented by Formula 8 instead of the compound represented by Formula 4 was used.

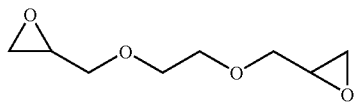

Formula 8

Comparative Example 1

Preparation of Electrolytic Solution

1 M LiClO$_4$ was added as a lithium salt to an organic solvent containing propylene carbonate to prepare an organic electrolytic solution.

Examples 6 to 10

Preparation of Lithium Battery

Graphite powder (mesocarbon microbeads (MCMB), Osaka Gas Chemicals Company) and a binder in which 5% by weight of polyvinylidene fluoride (PVdF) was dissolved in N-methylpyrrolidone (NMP) were mixed in a weight ratio of 95:5 in an agate mortar to prepare a slurry.

The slurry was cast on a Cu foil having a thickness of 19 μm, using a doctor blade, with a thickness of 100 μm: to prepare an anode electrode. The anode electrode was primarily dried in an oven at 90° C. for about 3 hours to evaporate the NMP, and secondarily dried in a vacuum oven at 120° C. for 2 hours to completely evaporate the NMP. Then, the anode electrode was rolled to have a thickness of 60 μm.

A 2016 type coin cell was prepared using the anode, lithium as the counter electrode, polyethylene as the separator and the organic electrolyte solution prepared in the Examples 1 to 5, respectively.

Comparative Example 2

Preparation of Lithium Battery

A coin cell having a capacity of 1.5 mAh was prepared in the same manner as in Example 6, except that the organic electrolytic solution prepared in Comparative Example 1 was used.

Experimental Example 1

Charge/Discharge Characteristics of Battery

Lithium electrodes of the coin cells having a capacity of 1.5 mAh prepared in Examples 6 to 10 and Comparative Example 2 were charged with a constant current of 0.1 C until the cells reached 0.001 V. Then, a constant voltage charging was performed until the current reached 0.05 C at a voltage of 0.001 V. Then, a constant current discharging was performed at 0.1 C until the voltage reached 1.5 V to obtain a charge/discharge capacity. The charge/discharge efficiency was calculated therefrom. The charge/discharge efficiency is calculated by Equation 1 below.

Initial charge/discharge efficiency(%)=discharge capacity of $1^{st}$ cycle/charge capacity of $1^{st}$ cycle    Equation 1

The results are shown in Table 1 and FIG. 1.

TABLE 1

| | 1$^{st}$ cycle | | |
|---|---|---|---|
| | Charge capacity (mAh) | Discharge capacity (mAh) | Initial charge/discharge efficiency (%) |
| Example 1 | 2.03 | 1.43 | 71 |
| Example 2 | 1.70 | 1.17 | 69 |
| Example 3 | 1.67 | 1.33 | 79 |
| Example 4 | 1.64 | 1.30 | 79 |
| Example 5 | 1.54 | 1.29 | 84 |
| Comparative Example 1 | — | — | — |

As shown in Table 1 and FIG. 1, in the batteries prepared in Examples 6 to 10 according to the present invention, the charge and discharge were reversibly performed and most of the batteries had the initial charge/discharge efficiency of 70% or higher. However, in the battery prepared in Comparative Example 2 in which the additive of the present invention was not used, the solvent was decomposed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An organic electrolytic solution for a lithium battery comprising:
    a lithium salt;
    an organic solvent comprising a high dielectric constant solvent and/or a low boiling point solvent;

a glycidyl ether compound selected from the group consisting of compounds represented by Formulae 1, 4-6 and 8-11 and combinations thereof:

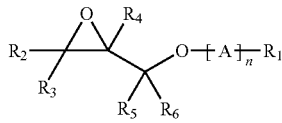

Formula 1 where:
A is selected from the group consisting of a C2-C5 alkyleneoxide group which is unsubstituted or substituted with a halogen atom; —C(=O)—; and —C($R_7$)($R_8$)—,
$R_1$ is selected from the group consisting of a C1-C20 alkoxy group which is unsubstituted or substituted with a halogen atom; a C6-C30 aryloxy group which is unsubstituted or substituted with a halogen atom; a C1-C20 alkyl group which is unsubstituted or substituted with at least one of a halogen atom and an oxirane group; a C5-C20 aliphatic hydrocarbon ring which is unsubstituted or substituted with a halogen atom; a C5-C20 aliphatic heterocyclic ring which is unsubstituted or substituted with a halogen atom; a C6-C30 aryl group which is unsubstituted or substituted with a halogen atom; a C7-C20 alkylaryl group which is unsubstituted or substituted with a halogen atom; a C7-C20 arylalkyl group which is unsubstituted or substituted with a halogen atom; a C2-C30 heteroaryl group which is unsubstituted or substituted with a halogen atom; an ether-containing monovalent group which is unsubstituted or substituted with a halogen atom; and —Si($R_9$)($R_{10}$)($R_{11}$),
$R_2$, $R_3$, $R_4$, $R_5$ and $R_6$ are each independently selected from the group consisting of a hydrogen atom; a C1-C20 alkoxy group which is unsubstituted or substituted with a halogen atom; a C6-C30 aryloxy group which is unsubstituted or substituted with a halogen atom; a C1-C20 alkyl group which is unsubstituted or substituted with a halogen atom; and a C5-C20 aliphatic hydrocarbon ring which is unsubstituted or substituted with a halogen atom,
$R_7$ and $R_8$ are each independently a hydrogen atom; or a C1-C20 alkyl group which is unsubstituted or substituted with a halogen atom,
$R_9$, $R_{10}$ and $R_{11}$ are each independently selected from the group consisting of a hydrogen atom; a C1-C20 alkoxy group which is unsubstituted or substituted with a halogen atom; a C6-C30 aryloxy group which is unsubstituted or substituted with a halogen atom; and a C1-C20 alkyl group which is unsubstituted or substituted with a halogen atom,
wherein at least one hydrogen atom of at least one of $R_1$ through $R_{11}$ or A is substituted with a halogen atom; and n is an integer of 0-10;

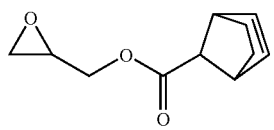

Formula 4

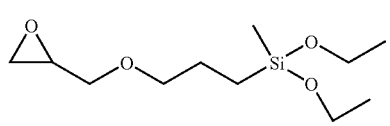

Formula 5

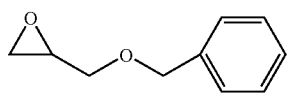

Formula 6

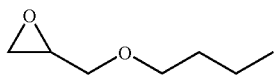

Formula 7

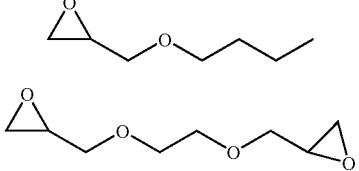

Formula 8

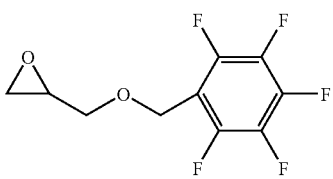

Formula 9

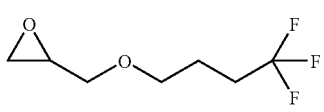

Formula 10

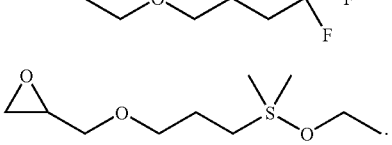

Formula 11

2. The organic electrolytic solution of claim 1, wherein A is an unsubstituted or halogen-substituted C2-C5 alkyleneoxide group selected from the group consisting of unsubstituted or halogen-substituted ethylene oxide, unsubstituted or halogen-substituted propylene oxide and unsubstituted or halogen-substituted isobutylene oxide.

3. The organic electrolytic solution of claim 1, wherein at least one of $R_1$, $R_2$, $R_3$, $R_4$, $R_5$, $R_6$, $R_9$, $R_{10}$ or $R_{11}$ is an unsubstituted or halogen-substituted C1-C20 alkoxy group selected from the group consisting of unsubstituted or halogen-substituted methoxy; unsubstituted or halogen-substituted ethoxy, unsubstituted or halogen-substituted cyclohexyloxy, and unsubstituted or halogen-substituted isopropyloxy.

4. The organic electrolytic solution of claim 1, wherein at least one of $R_1$, $R_2$, $R_3$, $R_4$, $R_5$, $R_6$, $R_9$, $R_{10}$ or $R_{11}$ is an unsubstituted or halogen-substituted C1-C30 aryloxy group selected from the group consisting of unsubstituted or halogen-substituted phenyloxy, unsubstituted or halogen-substituted naphthyloxy, and unsubstituted, or halogen-substituted diphenyloxy.

5. The organic electrolytic solution of claim 1, wherein at least one of $R_1$, $R_2$, $R_3$, $R_4$, $R_5$, $R_6$, $R_7$, $R_8$, $R_9$, $R_{10}$ or $R_{11}$ is an unsubstituted or halogen-substituted C1-C20 alkyl group selected from the group consisting of unsubstituted or halogen-substituted methyl, unsubstituted or halogen-substituted ethyl, unsubstituted or halogen-substituted propyl, unsubstituted or halogen-substituted isopropyl, unsubstituted or halogen-substituted n-butyl, unsubstituted or halogen-substituted sec-butyl, unsubstituted or halogen-substituted pentyl, unsubstituted or halogen-substituted iso-amyl, unsubstituted or halogen-substituted hexyl, unsubstituted or halogen-substituted heptyl, unsubstituted or halogen-substituted octyl, unsubstituted or halogen-substituted nonyl, unsubstituted or halogen-substituted decyl and unsubstituted or halogen-substituted dodecyl.

6. The organic electrolytic solution of claim 1, wherein at least one of $R_1$, $R_2$, $R_3$, $R_4$, $R_5$, $R_6$, $R_7$, $R_8$, $R_9$, $R_{10}$ or $R_{11}$ is an unsubstituted or halogen-substituted C5-C20 aliphatic hydrocarbon ring selected from the group consisting of unsubstituted or halogen-substituted norbornene, unsubstituted or halogen-substituted cyclohexyl and unsubstituted or halogen-substituted cycloheptyl.

7. The organic electrolytic solution of claim 1, wherein $R_1$ is an unsubstituted or halogen-substituted C6-C30 aryl group selected from the group consisting of phenyl, unsubstituted or halogen-substituted $C_1$-$C_{10}$ alkylphenyl group, halophenyl, unsubstituted or halogen-substituted cyanophenyl, unsubstituted or halogen-substituted dicyanophenyl, trifluorornethoxyphenyl, biphenyl, halobiphenyl, cyanobiphenyl, unsubstituted or halogen-substituted $C_1$-$C_{10}$ alkylbiphenyl, unsubstituted or halogen-substituted $C_1$-$C_{10}$ alkoxybiphenyl, unsubstituted or halogen-substituted o-, m-, or p-tolyl, unsubstituted or halogen-substituted o-, m- or p-cumenyl, unsubstituted or halogen-substituted mesityl, unsubstituted or halogen-substituted phenoxyphenyl, unsubstituted or halogen-substituted (α,α-dimethylbenzene)phenyl, (N,N'-dimethyl) aminophenyl, unsubstituted or halogen-substituted (N,N-diphenyl)aminophenyl, substituted or halogen-substituted pentalenyl, unsubstituted or halogen-substituted indenyl, naphthyl, halonaphthyl, unsubstituted or halogen-substituted $C_1$-$C_{10}$ alkylnaphthyl unsubstituted or halogen-substituted $C_1$-$C_{10}$ alkoxynaphthyl, unsubstituted or halogen-substituted cyanonaphthyl, unsubstituted or halogen-substituted anthracenyl, unsubstituted or halogen-substituted azulenyl, unsubstituted or halogen-substituted heptalenyl, unsubstituted or halogen-substituted acenaphthalenyl, unsubstituted or halogen-substituted phenalenyl, unsubstituted or halogen-substituted fluorenyl, unsubstituted or halogen-substituted anthraquinolyl, unsubstituted or halogen-substituted methylanthryl, unsubstituted or halogen-substituted phenanthryl, unsubstituted or halogen-substituted triphenylene, unsubstituted or halogen-substituted pyrenyl, unsubstituted or halogen-substituted chrysenyl, unsubstituted or halogen-substituted ethyl-chrysenyl, unsubstituted or halogen-substituted picenyl, perylenyl, chloroperylenyl, unsubstituted or halogen-substituted pentaphenyl, unsubstituted or halogen-substituted pentacenyl, unsubstituted or halogen-substituted tetraphenylenyl, unsubstituted or halogen-substituted hexaphenyl, unsubstituted or halogen-substituted hexacenyl, unsubstituted or halogen-substituted rubicenyl, unsubstituted or halogen-substituted coronenyl, unsubstituted or halogen-substituted trinaphthylenyl, unsubstituted or halogen-substituted heptaphenyl, unsubstituted or halogen-substituted heptacenyl, unsubstituted or halogen-substituted pyranthrenyl and unsubstituted or halogen-substituted ovalenyl.

8. The organic electrolytic solution of claim 1, wherein $R_1$ is a unsubstituted or halogen-substituted C2-C30 heteroaryl group selected from the group consisting of unsubstituted or halogen-substituted pyrazolyl, unsubstituted or halogen-substituted imidazolyl, unsubstituted or halogen-substituted oxazolonyl, unsubstituted or halogen-substituted thiazolyl, unsubstituted or halogen-substituted triazolyl, unsubstituted or halogen-substituted tetrazolyl, unsubstituted or halogen-substituted oxadiazolyl, unsubstituted or halogen-substituted pyridinyl, unsubstituted or halogen-substituted pyridazinyl, unsubstituted or halogen-substituted pyrimidinyl, unsubstituted or halogen-substituted triazinyl, unsubstituted or halogen-substituted carbazolyl, unsubstituted or halogen-substituted indolyl, unsubstituted or halogen-substituted quinolinyl and unsubstituted or halogen-substituted isoquinolinyl.

9. The organic electrolytic solution of claim 1, wherein $R_1$ is —Si($R_9$)($R_{10}$)($R_{11}$) and $R_9$, $R_{10}$ and/or $R_{11}$ is methoxy, ethoxy, n-propoxy, isopropoxy, n-butoxy, isobutoxy, sec-butoxy, t-butoxy, pentoxy or hexoxy.

10. The organic electrolytic solution of claim 1, wherein the glycidyl ether compound of Formula 1 is represented by Formula 2:

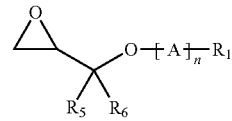

Formula 2 where:
A is selected from the group consisting of a C2-C5 alkyleneoxide group which is unsubstituted or substituted with a halogen atom; —C(=O)— and —C($R_7$)($R_8$)—, $R_1$ is selected from the group consisting of a C1-C20 alkoxy group which is unsubstituted or substituted with a halogen atom; a C6-C20 aryloxy group which is unsubstituted or substituted with a halogen atom; a C1-C20 alkyl group which is unsubstituted or substituted with at least one of a halogen atom and an oxirane group; a C5-C20 aliphatic hydrocarbon ring which is unsubstituted or substituted with a halogen atom; a C5-C20 aliphatic heterocyclic ring which is unsubstituted or substituted with a halogen atom; a C6-C30 aryl group which is unsubstituted or substituted with a halogen atom; a C7-C20 alkylaryl group which is unsubstituted or substituted with a halogen atom; a C7-C20 arylalkyl group which is unsubstituted or substituted with a halogen atom; a C2-C30 heteroaryl group which is unsubstituted or substituted with a halogen atom; an ether-containing monovalent group which is unsubstituted or substituted with a halogen atom; and —Si($R_9$)($R_{10}$)($R_{11}$), $R_5$ and $R_6$ are each independently selected from the group consisting of a hydrogen atom; a C1-C20 alkoxy group which is unsubstituted or substituted with a halogen atom; a C6-C20 aryloxy group which is unsubstituted or substituted with a halogen atom; a C1-C20 alkyl group which is unsubstituted or substituted with a halogen atom; and a C5-C20 aliphatic hydrocarbon ring which is unsubstituted or substituted with a halogen atom, $R_7$ and $R_8$ are each independently a hydrogen atom; or a C1-C20 alkyl group which is unsubstituted or substituted with a halogen atom, $R_9$, $R_{10}$ and $R_{11}$ are each independently selected from the group consisting of a hydrogen atom; a C1-C20 alkoxy group which is unsubstituted or substituted with a halogen atom; a C6-C20 aryloxy group which is unsubstituted or substituted with a halogen atom; and a C1-C20 alkyl group which is unsubstituted or substituted with a halogen atom, wherein at least one hydrogen atom of at least one of $R_1$, $R_5$ through $R_{11}$ or A is substituted with a halogen atom; and n is an integer of 0-10.

11. The organic electrolytic solution of claim 1, wherein the glycidyl ether compound of Formula 1 is represented by Formula 3:

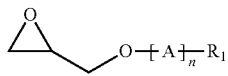

Formula 3 where:
A is selected from the group consisting of a C2-C5 alkyleneoxide group which is unsubstituted or substituted with a halogen atom; —C(=O)— and —C($R_7$)($R_8$)—, $R_1$ is selected from the group consisting of a C1-C20 alkoxy group which is unsubstituted or substituted with a halogen atom; a C6-C20 aryloxy group which is unsubstituted or substituted with a halogen atom; a C1-C20 alkyl group which is unsubstituted or substituted with at least one of a halogen atom and an oxirane group; a C5-C20 aliphatic hydrocarbon ring which is unsubstituted or substituted with a halogen atom; a C5-C20 aliphatic heterocyclic ring which is unsubstituted or substituted with a halogen atom; a C6-C30 aryl group which is unsubstituted or substituted with a halogen atom; a C7-C20 alkylaryl group which is unsubstituted or substituted with a halogen atom; a C7-C20 arylalkyl group which is unsubstituted or substituted with a halogen atom; a C2-C30 heteroaryl group which is unsubstituted or substituted with a halogen atom; an ether-containing monovalent group which is unsubstituted or substituted with a halogen atom; and —Si($R_9$)($R_{10}$)($R_{11}$), $R_7$ and $R_8$ are each independently a hydrogen atom; or a C1-C20 alkyl group which is unsubstituted or substituted with a halogen atom, $R_9$, $R_{10}$ and $R_{11}$ are each independently selected from the group consisting of a hydrogen atom; a C1-C20 alkoxy group which is unsubstituted or substituted with a halogen atom; a C6-C20 aryloxy group which is unsubstituted or substituted with a halogen atom; and a C1-C20 alkyl group which is unsubstituted or substituted with a halogen atom, wherein at least one hydrogen atom of at least one of $R_1$, $R_7$ through $R_{11}$ or A is substituted with a halogen atom; and n is an integer of 0-10.

12. The organic electrolyte solution of claim 1, wherein at least one of the hydrogen atoms of $R_1$, $R_2$, $R_3$, $R_4$, $R_5$, $R_6$, $R_7$, $R_8$, $R_9$, $R_{10}$ or $R_{11}$ is substituted with a halogen atom.

13. A lithium battery comprising:
a cathode;
an anode; and
an organic electrolytic solution of claim 1.

14. The organic electrolytic solution of claim 1, wherein the amount of the glycidyl ether compound is from 0.1 to 10% by weight based on the total weight of the organic solvent.

15. The organic electrolytic solution of claim 1, wherein the amount of glycidyl ether compound is from 1 to 5% by weight based on the total weight of the organic solvent.

16. The organic electrolytic solution of claim 1, wherein the concentration of the lithium salt is from 0.5 to 2.0 M.

17. The organic electrolytic solution of claim 1, wherein the high dielectric constant solvent is at least one solvent selected from the group consisting of ethylene carbonate, propylene carbonate, butylene carbonate and γ-butyrolactone.

18. The organic electrolytic solution of claim 1, wherein the low boiling point solvent is at least one solvent selected from the group consisting of dimethyl carbonate, ethylmethyl carbonate, diethyl carbonate, dipropyl carbonate, dimethoxyethane, diethoxyethane and a fatty acid ester derivative.

* * * * *

UNITED STATES PATENT AND TRADEMARK OFFICE
CERTIFICATE OF CORRECTION

PATENT NO.        : 8,119,038 B2
APPLICATION NO.   : 12/015785
DATED             : February 21, 2012
INVENTOR(S)       : Seok-soo Lee et al.

Page 1 of 1

It is certified that error appears in the above-identified patent and that said Letters Patent is hereby corrected as shown below:

In the Claims

| | |
|---|---|
| Column 14, lines 11-14 | Delete Formula 7 |
| Column 15, lines 16-17 | Delete "trifluorornethoxyphenyl,"<br>Insert -- trifluorormethoxyphenyl, -- |
| Column 15, line 26 | Delete "substituted"<br>Insert -- unsubstituted -- |
| Column 15, line 29 | After "alkylnaphthyl"<br>Insert -- group, -- |

Signed and Sealed this
Ninth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,119,038 B2  
APPLICATION NO. : 12/015785  
DATED : February 21, 2012  
INVENTOR(S) : Seok-soo Lee et al.

Page 1 of 1

It is certified that error appears in the above-identified patent and that said Letters Patent is hereby corrected as shown below:

In the Claims

| | |
|---|---|
| Column 14, Claim 1, lines 11-14 | Delete Formula 7 |
| Column 15, Claim 7, lines 16-17 | Delete "trifluorornethoxyphenyl,"<br>Insert -- trifluoromethoxyphenyl, -- |
| Column 15, Claim 7, line 26 | Delete "substituted"<br>Insert -- unsubstituted -- |
| Column 15, Claim 7, line 29 | After "alkylnaphthyl"<br>Insert -- group, -- |

This certificate supersedes the Certificate of Correction issued April 9, 2013.

Signed and Sealed this  
First Day of July, 2014

Teresa Stanek Rea  
*Acting Director of the United States Patent and Trademark Office*